(12) United States Patent
Bykov et al.

(10) Patent No.: US 8,312,560 B2
(45) Date of Patent: Nov. 13, 2012

(54) MULTIFUNCTIONAL SCANNING PROBE MICROSCOPE

(75) Inventors: Andrey Bykov, Moscow (RU); Vladimir Kotov, Moscow (RU); Viktor Bykov, Moscow (RU)

(73) Assignee: NT-MDT Service & Logistics Ltd., Castletroy, Limerick (IE)

( * ) Notice: Subject to any disclaimer, the term of this patent is extended or adjusted under 35 U.S.C. 154(b) by 0 days.

(21) Appl. No.: 13/148,114

(22) PCT Filed: Feb. 12, 2010

(86) PCT No.: PCT/IB2010/000278
§ 371 (c)(1),
(2), (4) Date: Aug. 5, 2011

(87) PCT Pub. No.: WO2010/092470
PCT Pub. Date: Aug. 19, 2010

(65) Prior Publication Data
US 2011/0296565 A1  Dec. 1, 2011

(30) Foreign Application Priority Data

Feb. 13, 2009  (EP) .................................... 09152876

(51) Int. Cl.
*G01N 13/16* (2006.01)
*G01Q 70/02* (2010.01)
*G01Q 10/00* (2010.01)
*G01B 7/34* (2006.01)

(52) U.S. Cl. ........... 850/1; 850/5; 850/6; 850/8; 850/40; 850/53

(58) Field of Classification Search .................. 850/1, 5, 850/6, 8, 40, 53; 73/105
See application file for complete search history.

(56) References Cited

U.S. PATENT DOCUMENTS

| | | | | |
|---|---|---|---|---|
| 6,006,594 A | * | 12/1999 | Karrai et al. ..................... | 73/105 |
| 8,141,168 B2 | * | 3/2012 | Nakayama et al. ............... | 850/6 |
| 2010/0005552 A1 | | 1/2010 | Nakayama et al. | |

FOREIGN PATENT DOCUMENTS

JP          05-232081 A    9/1993
(Continued)

OTHER PUBLICATIONS

Rosleff Baekmark T. R. et al., "Design and construction of a heat stage for investigation of samples by atomic force micoroscopy above ambient temperatures", Rev. Sci. Instrum. vol. 68, No. 1, Jan. 1997, pp. 140-142, cited in European Search Report for counterpart European Appl. No. 09152876.

(Continued)

*Primary Examiner* — Nikita Wells
(74) *Attorney, Agent, or Firm* — Westerman, Hattori, Daniels & Adrian, LLP

(57) ABSTRACT

The invention relates to a multifunctional scanning probe microscope comprising:
  a base (1);
  a preliminary approach unit (3) movably mounted on the base (1);
  a piezo-scanner (4) disposed on the preliminary approach unit (3);
  an object holder (5) disposed on the piezo-scanner (4);
  a sample (6) which comprises a measuring area (M) and is attached to the piezo-scanner (4) with the aid of the object holder (5);
  a platform (9) attached to the base (1) opposite the sample (6);
  an analyzer mounted on the platform (9) and comprising a first measuring head (13) which is oriented towards the sample (6) and is adapted for probing the measuring area (M) of the sample (6).
According to the invention, it comprises first and second guides (10, 11) fastened to the platform (9), the analyzer comprises a second measuring head (16) which is oriented towards the sample (6) and is adapted for probing the measuring area (M) of the sample (6), and the first (13) and second (16) measuring heads, are movably mounted on the first (10) and second (11) guides respectively.

20 Claims, 7 Drawing Sheets

FOREIGN PATENT DOCUMENTS

Figure 1:
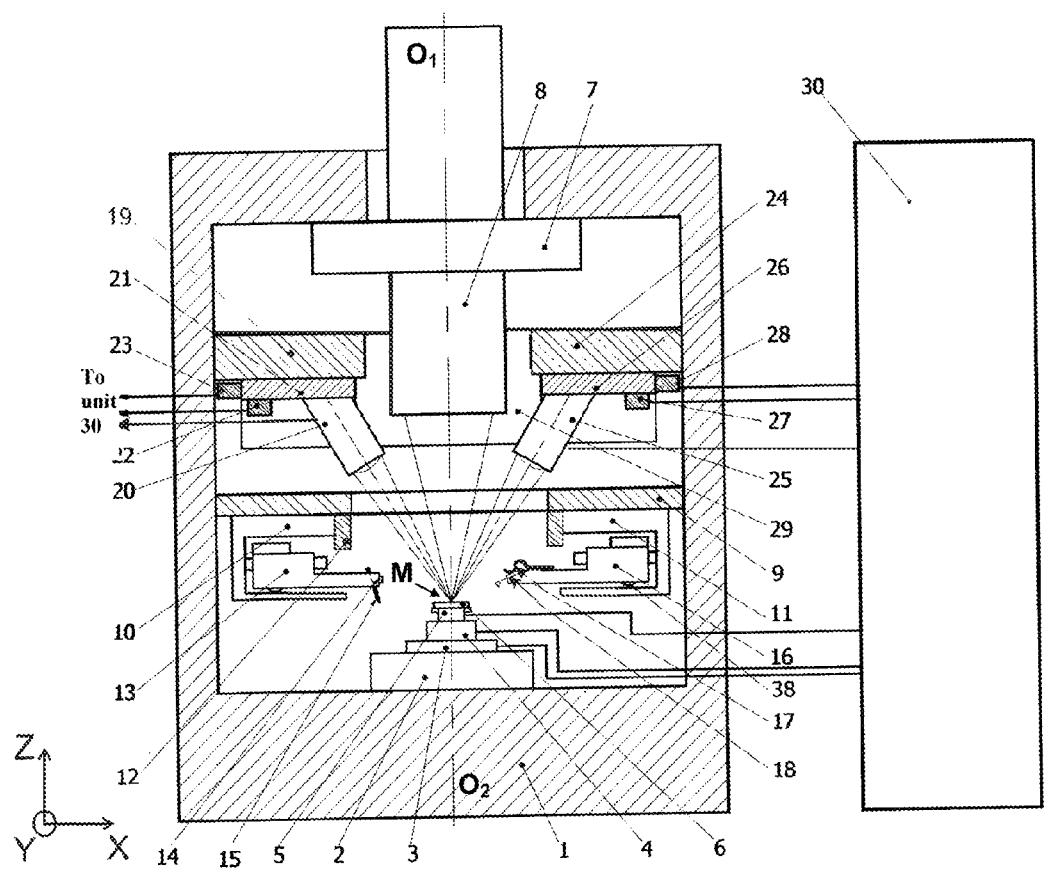

| | | |
|---|---|---|
| JP | 07-134137 A | 5/1995 |
| JP | 2002-139414 A | 5/2002 |
| JP | 2002-214112 A | 7/2002 |
| JP | 2006-234538 A | 9/2006 |
| RU | 2244332 C2 | 1/2005 |
| WO | 93/18525 A1 | 9/1993 |
| WO | 2008/013268 A1 | 1/2008 |

OTHER PUBLICATIONS

Yokoyama K. et al., "In situ tip exchange mechanism for the Demuth-type scanning tunneling microscope", Journal of Vacuum Science & Technology B 9 (1991) Mar. / Apr. . No. 2, Part II, New York, pp. 623-625, cited in European Search Report for counterpart European Appl. No. 09152876.

International Search Report for PCT/IB2010/000278, mailing date of Jul. 15, 2010.

European Search Report for counterpart European Appl. No. 09152876, mailing date of Jul. 10, 2009.

Translation of International Preliminary Report on Patentability (Form PCT/IB/373 and PCT/ISA/237)) of International Application No. PCT/IB2010/000278, date of mailing Sep. 15, 2011.

* cited by examiner

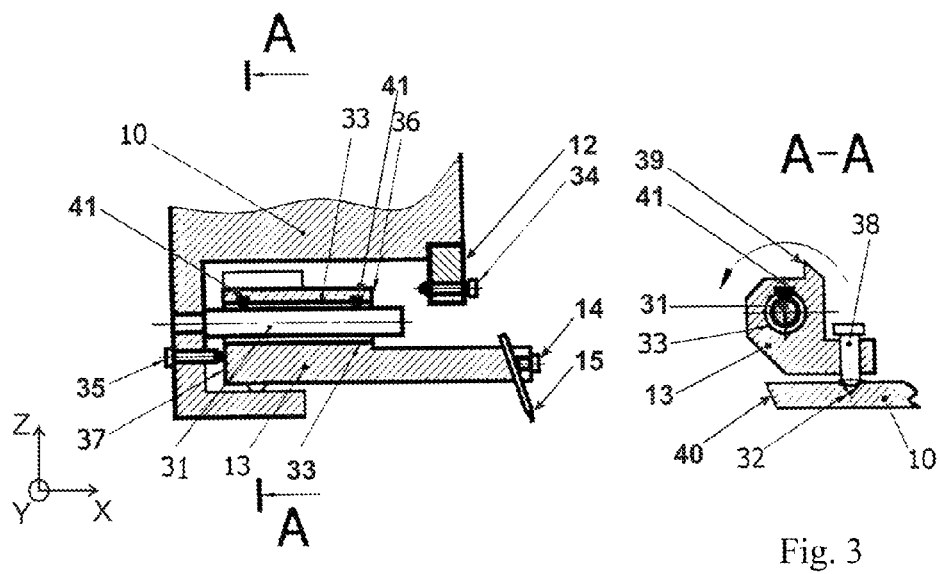
Fig. 2
Fig. 3
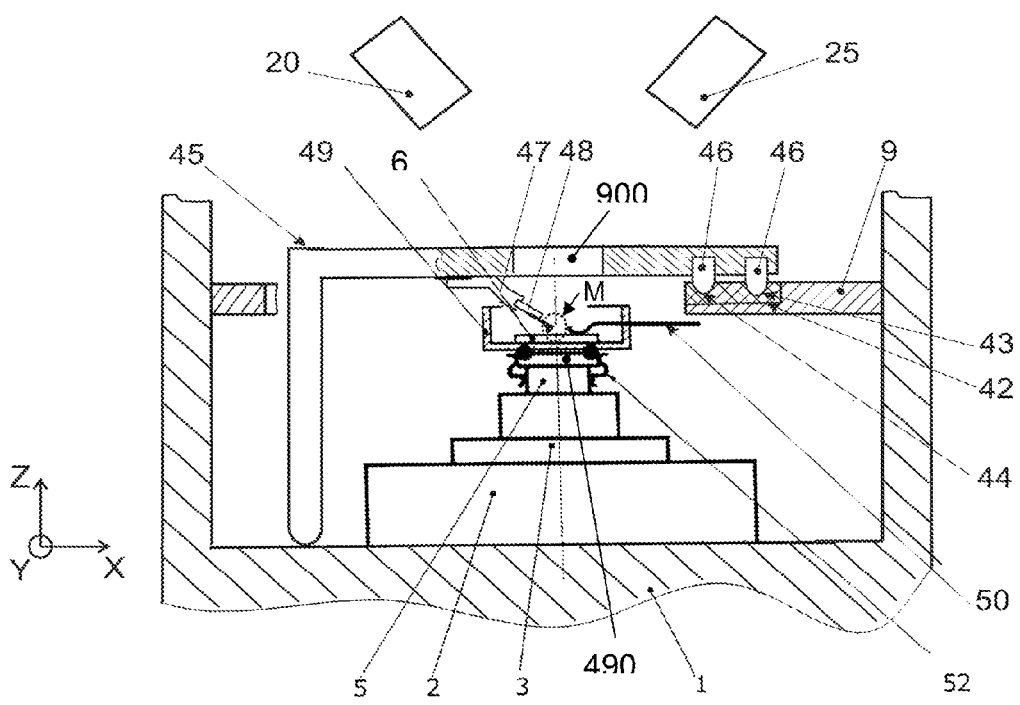
Fig. 4

MULTIFUNCTIONAL SCANNING PROBE MICROSCOPE

The invention relates to microscopes and, in particular, to multifunctional scanning probe microscopes, abbreviated "SPM," intended for studying samples in various modes, such as:
tunnel mode,
atomic power mode,
hardness measurement mode,
fluid mode with utilization of fluid cells and
electrochemical mode with utilization of electrochemical cells.

In particular, the invention relates to a multifunctional scanning probe microscope which comprises:
a base,
a preliminary approach unit, movably mounted on the base,
a piezo-scanner, disposed on the preliminary approach unit,
an object holder, disposed on the piezo-scanner,
a sample, comprising a measuring area and fastened to the piezo-scanner with the aid of the object holder,
a platform, fastened to the base opposite the sample,
an analyzer, mounted on the platform and comprising a first measuring head, which is oriented toward the sample and adapted for probing the measuring area of the sample.

Such a device is known and described in Russian Federation patent RU2244332. Its shortcoming consists of the fact that a change in the above-mentioned work modes is either connected with a complicated readjustment of the apparatus or is not at all possible.

Based on this observation, the present invention has as a goal to propose the multifunctional scanning probe microscope which makes it possible at least to smooth as a minimum one of the above-mentioned shortcomings. To achieve this goal, the multifunctional scanning probe microscope corresponding to the general description given above is characterized by the fact that it comprises first and second guides, fastened to the platform, that the analyzer comprises a second measuring head, oriented toward the sample and adapted for probing the measuring area of the sample, and that the first and second measuring heads are movably mounted, respectively, on the first and second guides.

Because of this arrangement, the multifunctional scanning probe microscope is simple in operation and has expanded functional possibilities, since it allows a rapid change of measurement modes, i.e., transition from one measurement mode to another without complicated readjustment of the apparatus. Thus, minimum operator work skills are sufficient for operating the invented multifunctional scanning probe microscope, which increases failure-free performance of the apparatus and decreases the risk of a breakdown of the apparatus, for example, because of its frequent readjustment by the operator.

There is an embodiment of the invention in which the multifunctional scanning probe microscope comprises an optical unit, fastened to the base and including:
a laser module,
first two-coordinate guides, oriented toward the sample and fastened to the laser module,
a laser, movably mounted on first two-coordinate guides and that can be optically linked with the measuring area of the sample,
a receiving module,
second two-coordinate guides, oriented toward the sample and fastened to the receiving module,
a photoreceiver, movably mounted on second two-coordinate guides and that can be optically linked with the measuring area of the sample.

There is also an embodiment of the invention in which the platform in the multifunctional scanning probe microscope comprises:
a first two-coordinate table connecting the preliminary approach unit with the base,
a second two-coordinate table, and
an optical microscope fastened to the second two-coordinate table.

There is also an embodiment of the invention in which the platform comprises stops with mobile screws. In this case, the first and second measuring heads are adapted to:
linearly move along first and second guides, respectively, to stops, and/or
radially move relative to first and second guides, respectively.

There is also an embodiment of the invention in which the multifunctional scanning probe microscope comprises:
a fluid module,
a fluid reservoir,
a catch.
In this case:
the catch is mounted on the platform,
the fluid module orientedly mounted on the catch,
the fluid reservoir is fastened to the object holder and linked with the analyzer.

There is also an embodiment of the invention in which the multifunctional scanning probe microscope comprises a hardness measurement module, orientedly mounted on the catch.

There is also an embodiment of the invention in which the first and second measuring heads in the multifunctional scanning probe microscope are simultaneously mounted on first and second guides, respectively, are heads of at least one of the types mentioned below: (a) tunnel head, in which the probe is made in the form of a needle, and the probe holder is made in the form of a needle hold; (b) atomic power head, in which the probe is made in the form of a cantilever, and the probe holder in the form of a cantilever hold.

There is also an embodiment of the invention in which the multifunctional scanning probe microscope comprises:
a warming unit,
a thermocouple,
a noncontact temperature gauge.
In this case:
the warming unit is mounted on the object holder,
the thermocouple is fastened to the warming unit,
the noncontact temperature gauge is optically linked with the sample.

There is also an embodiment of the invention in which a precise needle hold is introduced in the multifunctional scanning probe microscope, which comprises:
a bracket with V-shaped groove, extended along the central guide and having microroughness of a predetermined first size,
a screw, extended along the longitudinal axis, mounted in the bracket and linked with the V-shaped groove.

There is also an embodiment of the invention in which the screw has a right-handed thread and the longitudinal axis of the screw is offset relative to the central guide V-shaped groove.

Alternatively, there is also an embodiment of the invention in which the screw has a left-handed thread and the longitudinal axis of the screw is offset relative to the central guide V-shaped groove.

There is also an embodiment of the invention in which the screw comprises an end, whose marginal surface has microroughness of a second predetermined size greater in comparison with the first size of the microroughnesses of the V-shaped groove.

Alternatively, there is also an embodiment of the invention in which the screw comprises an end, whose marginal surface has a microroughness of a predetermined second size less in comparison with the first size of the microroughnesses of the V-shaped groove.

There is also an embodiment of the invention in which a first precise cantilever hold is introduced in the multifunctional scanning probe microscope, which comprises:
 a first support,
 a second support with bevel,
 a first plate,
 a spring element.

In this case:
 the first support, the second support with bevel and the spring element are fastened to the first plate and adapted to interact with the cantilever,
 the spring element is mounted opposite the first support.

There is also an embodiment of the invention in which a second precise cantilever hold is introduced in the multifunctional scanning probe microscope, which comprises:
 a third support,
 a fourth support with bevel,
 a second plate,
 a cam with elastic element.

In this case:
 the third support, the fourth support with bevel and cam with elastic element are fastened to the second plate and adapted to interact with the cantilever,
 the cam is mounted on the second plate opposite the fourth support with bevel.

There is also an embodiment of the invention in which the first and second measuring heads in the multifunctional scanning probe microscope comprise mechanized drives.

Other distinguishing features and advantages of the invention ensue from the description given below to illustrate the essence of the invention and not limiting the latter, with references to accompanying FIGS. 1-14.

In FIG. 1 is schematically depicted a simplified basic partial sectional view of the multifunctional scanning probe microscope according to one of the embodiments of the invention.

In FIG. 2 is schematically depicted a simplified basic sectional view of a first guide with first measuring head according to one of the embodiments of the invention.

In FIG. 3 is schematically depicted a section in plane A-A of the first guide with the first measuring head in FIG. 2.

In FIG. 4 is schematically depicted a simplified basic partial sectional view of one of the embodiments of the catch with the fluid module.

Figure 5:
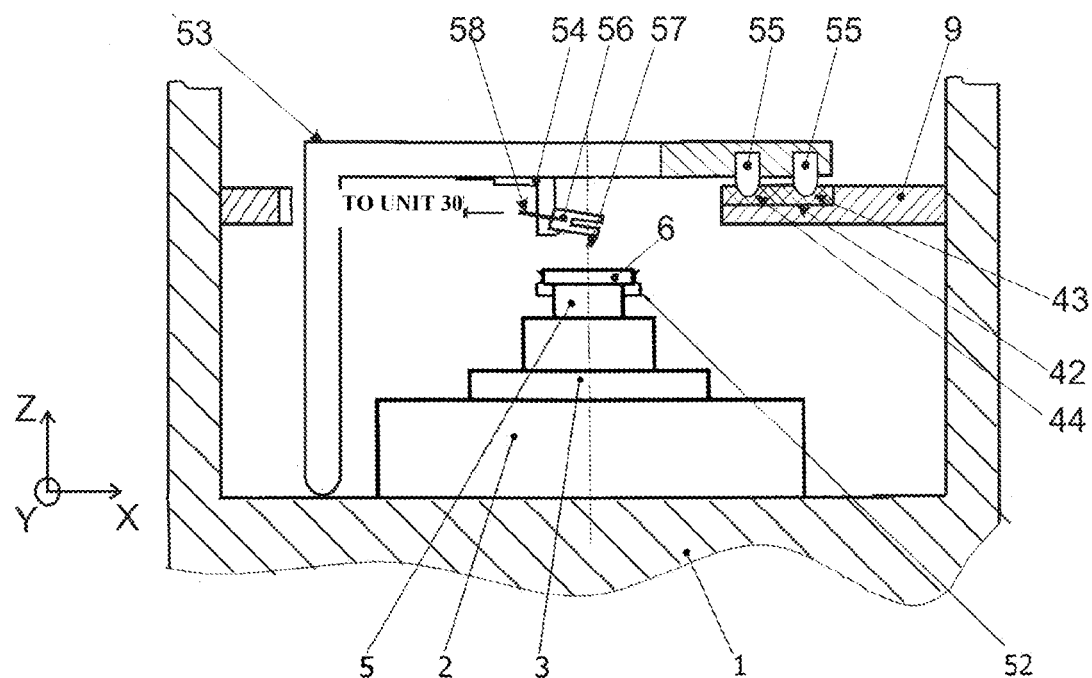

In FIG. 5 is schematically depicted a simplified basic partial sectional view of one of the embodiments of the catch with the hardness measurement module.

Figure 6:
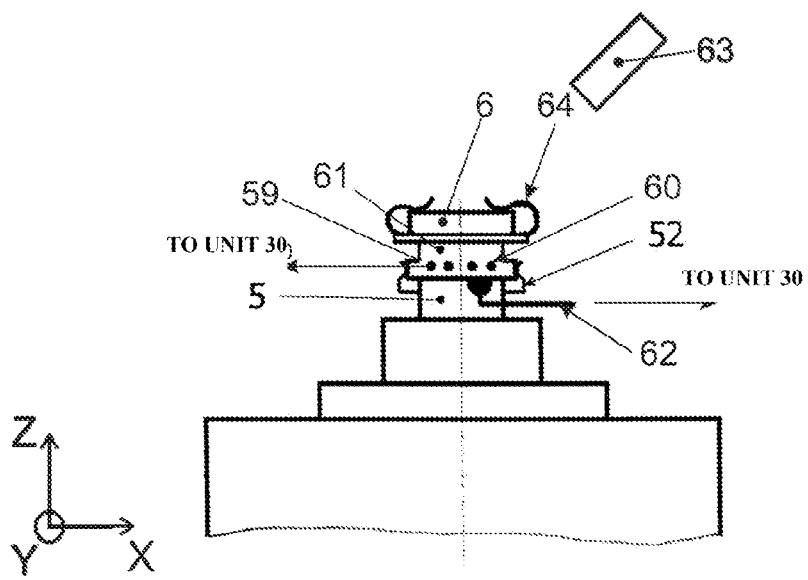

In FIG. 6 is schematically depicted a basic form of the warming unit according to one of the embodiments of the invention with a sample fastened to the object holder.

Figure 7:
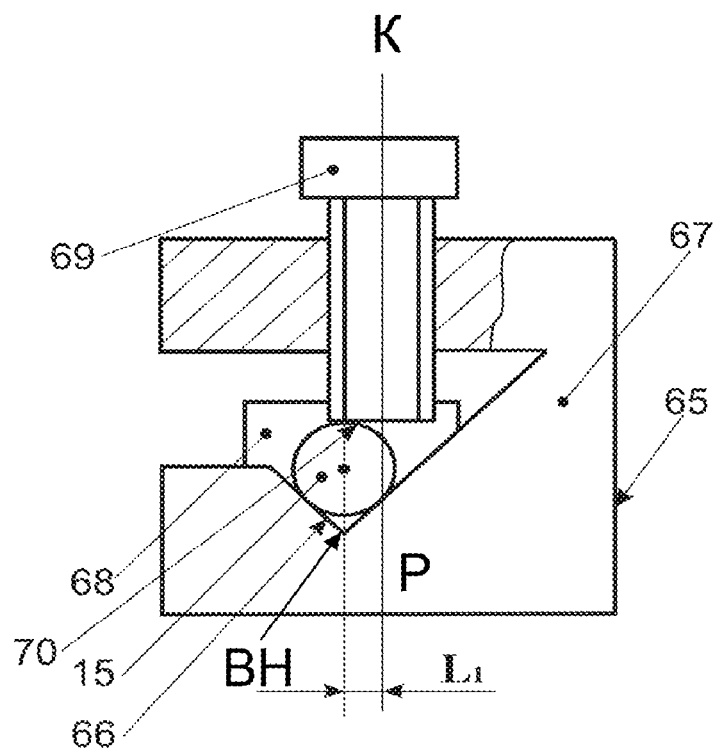

In FIG. 7 is schematically depicted a variation of one of the embodiments of the precise needle hold, side view of its point with partial section.

Figure 8:
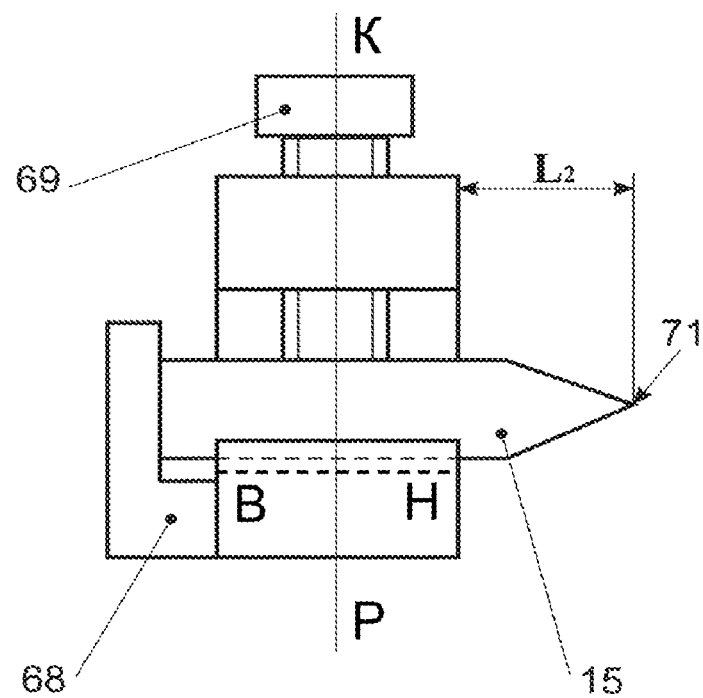

In FIG. 8 is schematically depicted a view from the side of, of the precise needle hold in FIG. 2.

Figure 9:
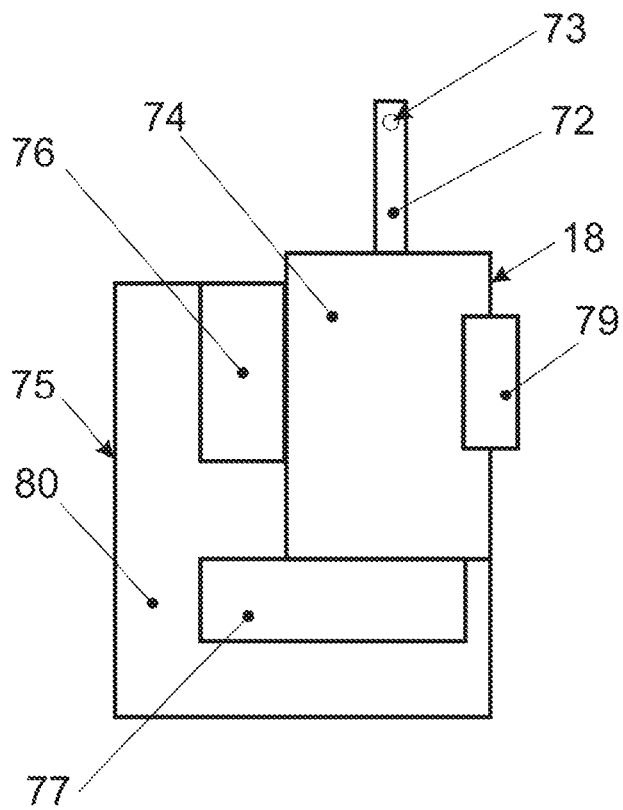

In FIG. 9 is schematically depicted a first embodiment (spring) of the first precise cantilever hold, side view of platform.

Figure 10:
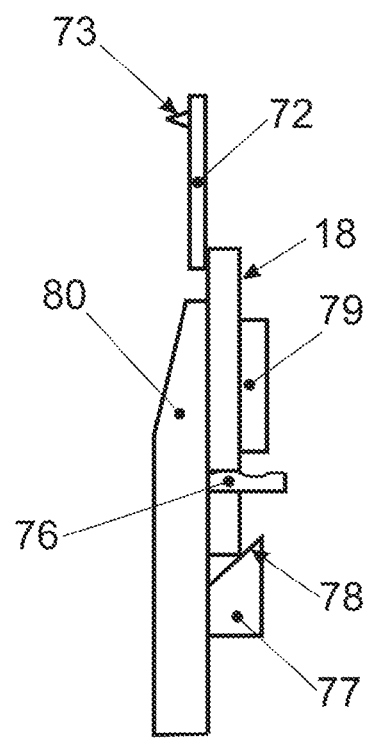

In FIG. 10 is schematically depicted a view from the side of the first precise cantilever hold in FIG. 9.

Figure 11:
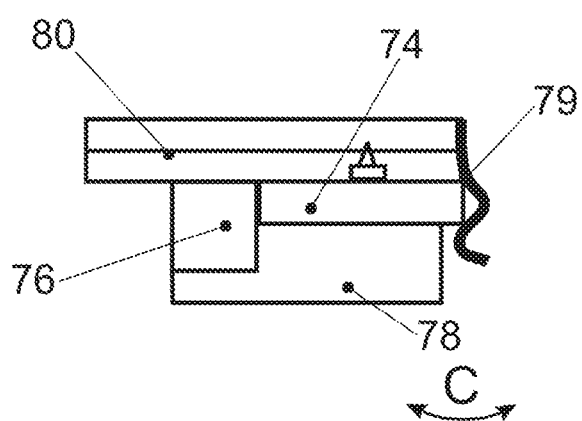

In FIG. 11 is schematically depicted a view from above of the first precise cantilever hold in FIG. 9.

Figure 12:
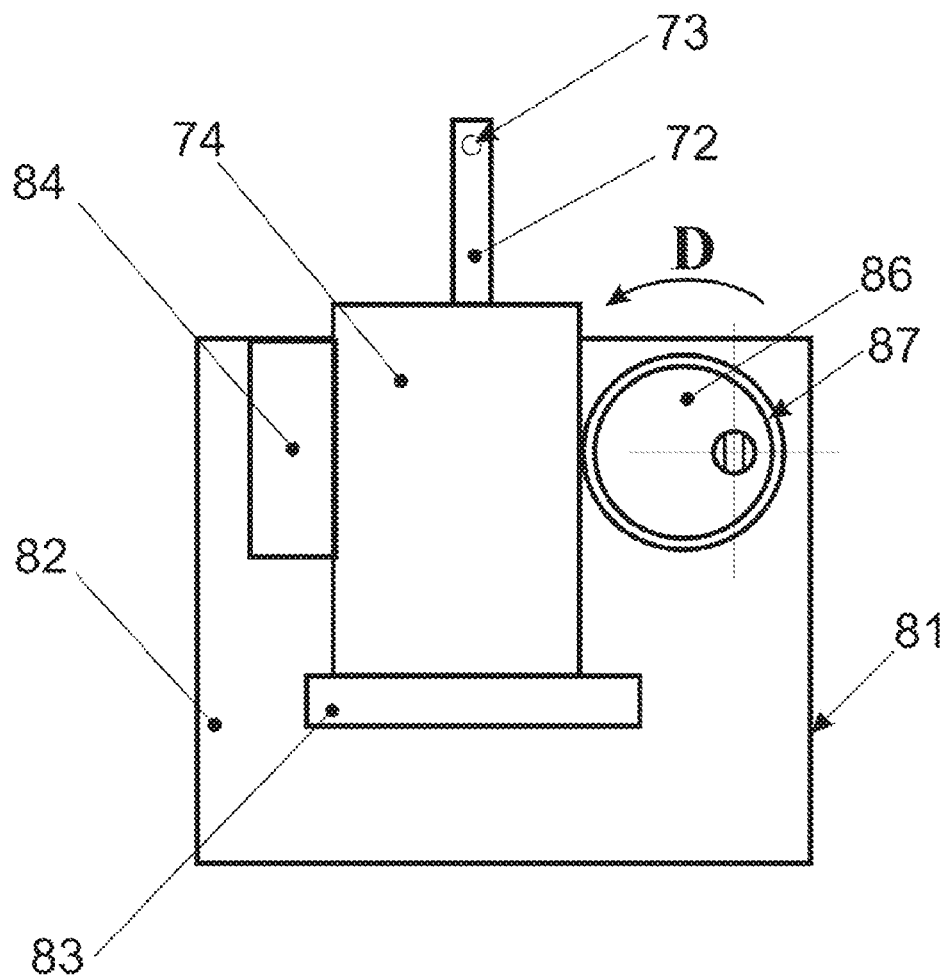

In FIG. 12 is schematically depicted a second embodiment (cam) of the second precise cantilever hold, side view of platform.

Figure 13:
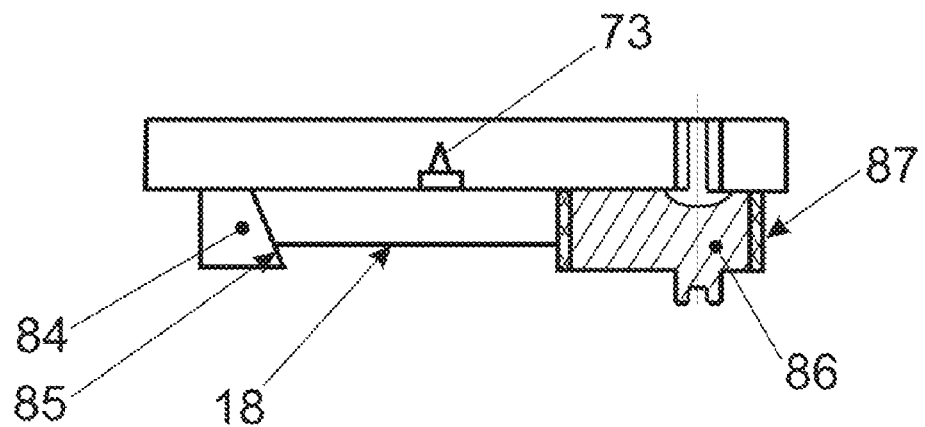

In FIG. 13 is schematically depicted a view from above with partial section of the second precise cantilever hold in FIG. 12.

Figure 14:
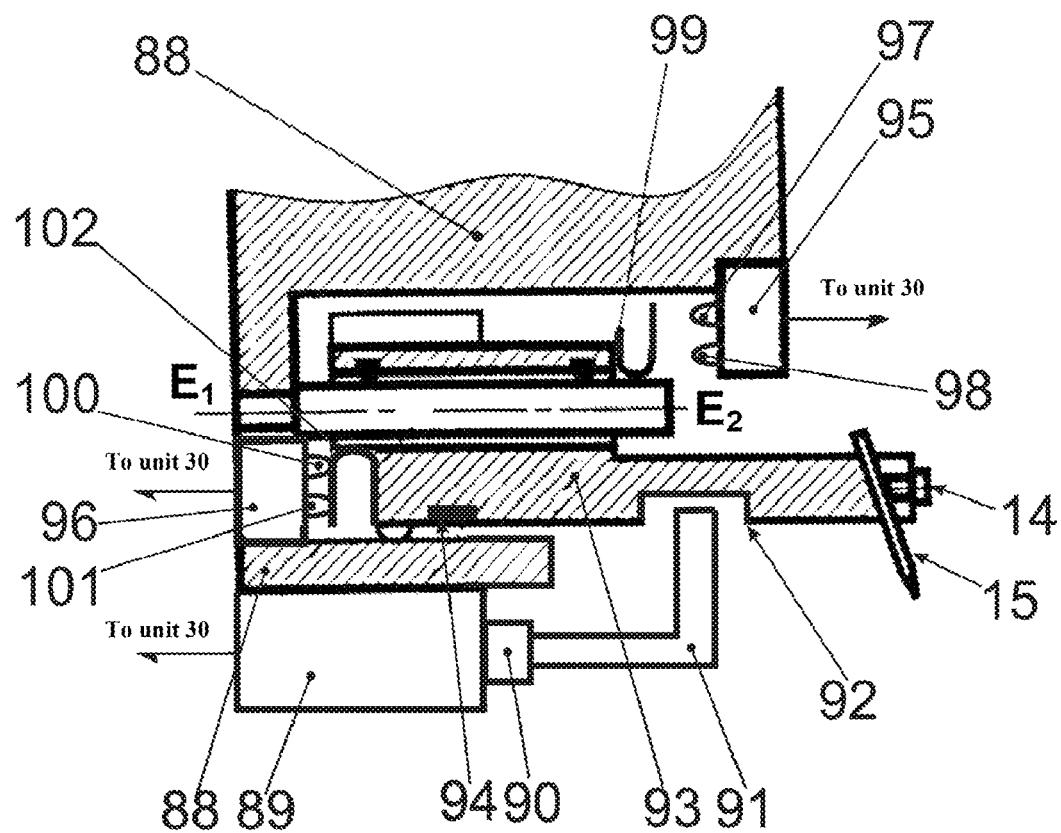

In FIG. 14 is schematically depicted a simplified basic partial sectional view of a motorized embodiment of the measuring heads.

As mentioned above and illustrated in FIGS. 1-14, the invention relates to multifunctional scanning probe microscopes, abbreviated "SPM," intended for studying samples in various modes.

The multifunctional scanning probe microscope depicted in FIG. 1 comprises a base 1, on which is mounted a first two-coordinate (located in the X-Y plane in FIG. 1) table 2. This table 2 can be moved manually or have a piezo-inertia drive or electromechanical motor, for example, a stepper motor. The first two-coordinate table 2 can comprise two mobile carriages, mounted one on the other, with the rolling guides, sliding guides or elastic guides on the flat springs. Most frequently, to reduce clearances in the connections, sliding guides are used. Some sliding guides are disposed on the lower base of the first two-coordinate table 2 (for example, a V-shaped groove and plane). Along these guides slide, for example, balls fastened to a mobile carriage, on which there are others guides, on which is mounted another mobile carriage with balls (a detailed depiction of first two-coordinate table 2 is not shown in FIG. 1). For movements of carriages in the given construction, it is expedient to use standard stepper motors. The range of displacement of the first two-coordinate table 2 can, for example, by $10^{-2}$ m exceed the dimensions of the sample. In some cases, a rotary carriage for turning the sample in the X-Y plane can be mounted on first two-coordinate table 2. On first two-coordinate table 2 is fastened preliminary approach unit 3, comprising piezo-scanner 4. On piezo-scanner 4 is mounted the object holder 5.

On the object holder 5 can be disposed sample 6, which comprises at least one measuring area M. The means of fixing sample 6 to holder 5 can be various. Most frequently, spring tightening legs are used. However, glue or two-sided sticky film can be used. In this case, one side of the adhesive tape adheres to object holder 5 and the other to sample 6 (not shown). It is possible to utilize carriers (not shown) of samples 6, to which samples 6 are fastened by the same glue or spring legs, and then carrier with sample 6 is mounted on object holder 5. This embodiment can be used when samples are difficult to pick up by pincers, (for example, because of the small sizes of samples 6) and operationally to mount on object holder 5. Carriers of samples 6 can have convenient holds for pincers or be magnetic for magnetic fixation on object holder 5. In this case, object holder 5 can comprise a magnet or itself, be made out of magnetic material.

Preliminary approach unit 3 and piezo-scanner 4 are the basic electromechanical units of probe microscopy. As piezo-scanners, piezoceramic sectioned tubes or packets of sintered piezoceramic plates, ensuring X, Y, Z (for example, orthogonal) displacement, are usually used. Most frequently, piezoceramic sectioned tubes are used (not shown in the drawings). Their characteristic dimensions: length $3*10^{-1}$ m, outside diameter $10^{-2}$ m, inside diameter $9*10^{-2}$ m. A part of the tube along the length is covered with the solid electrodes (inside and outside the tube), upon supplying voltage on which the tube is either elongated or shortened. Another part of the tube has four electrodes on the outside surface and four electrodes on the inside surface of the tube, disposed opposite each other. Upon supplying voltages on them, it is possible to control the sizes of fragments of the piezoceramic tubes and to bend them. Thus, displacement of the end of the piezoceramic sectioned tube with object holder 5 is accomplished along the X, Y, Z coordinates. Preliminary approach unit 3 can be made based on inertial drives, differential drives and the like. In this case, the most effective will be a mechanical drive with stepper motor and screw transmission to the carriage mounted on guides (not shown). Thereby, a stepper motor with screw will be mounted on first two-coordinate table 2. On it is fastened a guide, along which can slide a carriage with screw nut tightened to it, for example, by a spring. This drive is similar to one of the drives of first two-coordinate table 2. The minimum approach step should be less than $10^{-6}$ m, so that in the drive process piezo-scanner 4 would have time to work out the approach in the opposite direction and a breakdown in the probe did not occur.

It must be noted that base 1 in FIG. 1 is represented schematically. It can consist of two separable elements (lower plate and cover) and comprise holes for mounting the sample and other equipment. These separable elements are not related to the essence of the invention; therefore, they are not shown on the drawings.

On, base 1 is mounted optical microscope 8 by means of second two-coordinate (located in the X-Y plane in FIG. 1) table 7. As shown in FIG. 1, the optical axis $O_1O_2$ of optical microscope 8 is perpendicular to sample 6 and passes through its measuring area M. Second two-coordinate table 7 can be analogous to first two-coordinate table 2 described above. On base 1 opposite sample 6 is fastened platform 9, which on the side of sample 6 comprises first 10 and second 11 guides, and also two stops 12. Platform 9 can be rigidly fastened to base 1, for example, by welding or screws (not shown). As shown in FIG. 1, platform 9 comprises working opening 900, which allows optical coupling of optical microscope 8 with sample 6. On first guide 10 is mounted first measuring head 13 with first probe hold 14, made, for example, in the form of needle 15 for tunnel measurements. In this case, first probe hold 14 will be called hold 14 of needle 15. First measuring head 13 is oriented toward sample 6 and is adapted for probing measuring area M of sample 6. On second guide 11 is mounted second measuring head 16 with second probe hold 17, made, for example, in the form of cantilever 18 for the atomic power measurements. In this case, second probe hold 17 will be called hold 17 of cantilever 18. Second measuring head 16 is oriented toward sample 6 and is adapted for probing measuring area M of sample 6. In the simplest case, hold 14 of needle 15 can be made in the form of a tightening screw, and hold 17 of cantilever 18, in the form of a spring. First 13 and second 16 measuring heads are analyzers. Utilization of second two-coordinate table 7, and also of first 13 and second 16 measuring heads, respectively movably mounted on first 10 and second 11 guides and linked with stops 12, makes it possible to operationally change the measurement modes and the measuring area M of sample 6, which expands the SPM functional possibilities.

On base 1 is fastened laser module 19, which on the side of platform 9 comprises laser 20, movably mounted on first two-coordinate guides 21 and linked with first 22 and second 23 drives. On base 1 is fastened receiving module 24, which comprises photoreceiver 25, movably mounted on second two-coordinate guides 26 and linked with third 27 and fourth 28 drives. This execution makes it possible to carry out operational adjustment (optical coupling through working opening 900 of platforms 9):

of laser beam 20 on measuring area M of sample 6 and, in particular, on cantilever 18, which is located in measuring area M, and of photoreceiver 25 on the laser beam, reflected from measuring area M of sample 6 and, in particular, from cantilever 18, which is located in measuring area M, after changing work modes.

This expands the functional possibilities of the device. Laser module 19 and receiving module 24 are optical unit 29.

Rigid fastening of laser module 19 and receiving module 24 on base 1 can be accomplished with the aid of screws, which are not shown in order to simplify the drawings. First 2 and second 7 two-coordinate tables can also be fastened to base 1. First two-coordinate guides 21 and second two-coordinate guides 26 in FIG. 1, respectively oriented toward platform 9 and, therefore, toward sample 6, are conditionally shown. They can be made in the form of two independent carriages, mounted one on the other and linked respectively:

one, with first 22 and second 23 drives, the other, with third 27 and fourth 28 drives.

First two-coordinate guides 21 with first 22 and second 23 drives, on one side, and second two-coordinate guides 26 with third 27 and fourth 28 drives, on the other side, can be analogous to first 2 and second 7 two-coordinate tables.

As laser 20, it is possible to use a helium-neon laser with wavelength equal to $0.6328*10^{-6}$ m; while as photoreceiver 25, a photoreceiver with reception range which includes this wave. Infrared lasers, infrared photo- and light guides can also be used, which will improve the process of observing the displacement zone due to elimination of its ambient illumination in the operator eye visible region of the spectrum.

Laser 20 and photoreceiver 25 can be optically linked (through working opening 900 of platform 9), respectively, with first 13 and second 16 measuring heads in measuring area M, and, more specifically, with their probes, i.e., with needle 15 and with cantilever 18, respectively. Optical coupling of needle 15 with laser 20 can perform an auxiliary role, for example, for additional illumination of the measuring area.

First 13 and second 16 measuring heads can be simultaneously mounted on first 10 and second 11 guides, respectively. In this case, both measuring heads (both first 13 and second 16) can be of one type, for example, both be tunnel heads (not shown in the drawings), or both be atomic power heads (not shown in the drawings). Due to this, both measuring heads (both first 13 and second 16) are interchangeable. This makes it possible upon breakdown (for example, upon blunting of needle 15 in tunnel mode) during measurements, for example, of first measuring head 13, not to spend time on its replacement. It is sufficient put it off the side from sample 6, then to approach the second measuring head 16 to sample 6 and immediately after this to continue interrupted measurements in the same mode. The possibility of minimizing time lost because of failure of first measuring head 13 and continuing measurements in the same mode practically without delay is especially important in the case where the characteristics of sample 6 rapidly change in time. This expands the SPM functional possibilities.

As an alternative embodiment, one of the measuring heads (for example, the first 13, as shown in FIG. 1) can be a tunnel head, and another (for example, the second 16, as shown in FIG. 1) can be atomic power. Due to this, it is possible to rapidly change the tunnel mode of the measurements of sample 6 to atomic power and back, thus alternating, one measurement mode with another measurement mode. This expands SPM functional possibilities.

The actuating elements, numbered on drawings 3, 4, 5, 22, 23, 27, 28, 29 and described above, are connected to control unit 30 (controller). First 2 and second 7 coordination tables can also be connected to control unit 30, and more specifically, their stepper motors, and also cantilever 18. In addition to this, needle 15 is connected to control unit 30. These connections are not shown in FIG. 1 in order to simplify the drawings. Controller 30 provides standard functions of scanning probe microscopes. It can include two analog-digital converters, abbreviated "ADC," piezo-scanner deviation amplifiers with digital-analog converter, abbreviated "DAC," and high-voltage amplifier, for feedback loop with amplifiers and integrator, multiplexers, signal commentators, input amplifiers, signal filters, signal converters, drive control unit with two DACs, stepper motors control unit and thermostat.

First guide 10 (FIGS. 1-3) and second guide 11 (FIG. 1) can comprise cylindrical stocks 31, and also V-shaped guides 32. First measuring head 13 (FIGS. 1-3) and second measuring head 16 in this case can have cylindrical generatrices 33. On first 10 and second 11 guides of stops 12 can be comprised first screws 34, which have adjusting shifts along the X-coordinate and interacting with first surfaces 36. After accomplishing an adjusting shift, first screw 34 can be fixed by the lock nut (not shown). Second screws 35 can interact with second surfaces 37. Third screws 38 are mounted on first 13 and second 16 measuring heads (FIG. 1) and are found in interaction with V-shaped guides 32. Friction pairs in first 10 and second 11 guides can be made by pairs of the following materials: steel-brass, steel-bronze, steel-steel, Polycor-steel or Polycor-bronze. First 13 and second 16 measuring heads are made hinged. Thus, they can be rotated (relative to first 10 and second 11 guides, respectively) on cylindrical stocks 31 to the stop of projections 39 in ends 40 (FIG. 3). This allows implementing an operational change (charging) of probes (outside the measuring area), and it is respectively fast and simple to change work modes. To reduce clearances in heads 13 and 16, frictional inserts 41, made, for example, from fluoroplast or Caprolon, can be fastened.

Besides first 10 and second 11 guides, on platform 9 can be located catch 42 (FIG. 4), that includes spherical groove 43 and U-shaped groove 44, elongated along the Y-coordinate (catch 42 is not shown on FIG. 1). Fluid module 45 is mounted in catch 42 by means of spherical bearings 46.

Fluid module 45 includes hold 47 of the third probe. The third probe is made, for example, in the form of cantilever 48 for fluid measurements, optically linked with laser 20 and photoreceiver 25. Cantilever 48 for fluid measurements can be glued in to hold 47 of the third probe.

On object holder 5 in this case will be fastened fluid reservoir 49, in which by means of tightening leg 50 is mounted sample 6 (FIG. 4). Fluid reservoir 49 is optically linked with the analyzer and, as a result, with laser 20 and photoreceiver 25. Reservoir 49 can be made from quartz or fluoroplast. For fastening reservoir 49 on holder 5, first spring legs 52, glue film or a magnet in the bottom of the reservoir (not shown) can be used. The lower part of reservoir 49 oriented toward holder 5 can comprise metallic base 490, for example, glued to reservoir 49 from the side of holder 5. This metallic base 490 is adapted for contact directly with first spring legs 52 (FIG. 4). These same first spring legs 52 can be used for fastening sample 6 according to FIG. 1.

In FIG. 4, catch 42 is conditionally shown. Spherical bearings 46 can be offset on the Y-coordinate relative to each other. Catch 42 can also be located on base 1, and the spherical bearings in the lower part of fluid module 45 (not shown).

Due to the coordinately oriented mounting of fluid module 45, the SPM is adapted for conducting fluid or electrochemical measurements, which expands its functional possibilities.

On platform 9 (FIG. 5), as alternatives to fluid module 45, on the same catch 42 can be mounted hardness measurement module 53 with hold 54 of the fourth probe and spherical bearings 55.

As the fourth hardness measurement probe, quartz resonator 56 with needle 57 can be used This also expands the functional possibilities of the device. Fastening of quartz resonator 56 in hold 54 can be accomplished, for example, by glue. The outputs 58 quartz resonator 56 are connected to control unit 30.

Mounting of fluid module 45 and hardness measurement module 53 on platform 9 is accomplished in alternative order with first 13 and second 16 measuring heads separated to different sides (FIG. 1). In order to simplify the drawings, first 10 and second 11 guides, and also first 13 and second 16 heads, are not shown in FIGS. 4-5.

In one of the realization embodiments of the invention, on object holder 5 is fastened warming unit 59 (FIG. 6) with sample 6. Warming unit 59 as a heater can comprise, for example, metallic (in particular, Nichrome) helix 60, baked into support 61 of insulating material (for example, ceramics). Support 61 is linked with thermocouple 62. Thermocouple 62 is adapted for measuring the temperature of support 61. Thermocouple 62 is electrically insulated relative to object holder 5 and warming unit 59 (not shown in FIG. 6). As an alternative embodiment, it is possible to use a noncontact temperature gauge 63 (optical pyrometer or infrared thermometer) for measuring the temperature of support 6 with its working (i.e., oriented toward first 13 and second 16 measuring heads) side, which increases the measurement accuracy and expands the functional possibilities of the apparatus. Noncontact temperature gauge 63 can be disposed outside of base 1 and be optically linked with sample 6 through an optically transparent window, situated in base 1 (not shown). Sample 6 on warming unit 59 can be fastened by second spring legs 64. It must be noted that warming unit 59 is made quick-detachable and can be been applied with all measurement modes, which also expands SPM functional possibilities.

Operational fastening of warming unit 59 on object holder 5 can be accomplished with utilization of first spring legs 52.

In one of the embodiments (FIG. 7-8), it is possible to use coordinately oriented mounting of needle 15 in precise hold 65 of needle 15. Precise hold 65 of needle 15 comprises:

bracket 67 with V-shaped groove 66, extended along central guide BH and having microroughnesses (in particular, the microroughness height measured along longitudinal axis KP) of a predetermined first size, screw 69, extended along longitudinal axis KP, mounted in bracket 67 and linked with V-shaped groove 66.

Screw 69 comprises end 70 with marginal surface, oriented toward central guide BH. The marginal surface of end 70 has microroughness (in particular, the microroughness height measured along longitudinal axis KP) of a predetermined second size.

It must be noted, that the form of groove 66 can be different: U-shaped or π-shaped (not shown in the drawings); however, most frequently V-shaped grooves are used, as most technologically effective.

Of needle 15 for tunnel measurements can be prefabricated of identical length. This can be accomplished via partial burnishing of nonoperative ends of needle 15 (opposite point 71)

with subsequent inspection of the length of needle 15 under optical microscope 8. Needle 15 can be mounted in the V-shaped groove 66 of bracket 67 to stop 68 and pressed by screw 69. In this case, screw 69 can be linked with V-shaped groove 66 and, as a result, with needle 15. So that in the process of pulling into bracket 67, needle 15 would not move away from stop 68, screw 69 (longitudinal axis KP of screw 69) is displaced relative to central guide BH of V-shaped groove 66 by the value $L_1 \sim 10^{-3}$ m upon right-handed threading (for example, equal to M2) of screw 69 (FIG. 7). Thus, in the process of fastening needle 15 in bracket 67, the edge (marginal surface oriented toward needle 15) of end 70 of screw 69, which has a right-handed thread, during rotation exerts force influence on needle 15, directed to the side of stop 68. This ensures reliable contact between needle 15 and stop 68.

In addition to this, there is an alternative possibility on screw 69 and correspondingly in bracket 67 to use left-handed thread. In this case, upon fastening needle 15, it can be moved to the side from stop 68. This can be necessary when tunnel measurements are connected with repeated utilization of one needle 15. In this case, the blunted end (point) 71 of needle 15 is trimmed by scissors, as a result of which it is shortened. In order to keep the situation of point 71 of needle 15, it is possible to push it from stop 68 in the process of fastening in bracket 67. In this case, the nonoperative end of needle 15 will go away from stop 68 (not shown in FIG. 8). With the thread of screw 69 equal to M3*0.5 and diameter of needle 15 of the order of $0.5*10^{-3}$ m, this shift can reach the value of $1.5*10^{-3}$ m, which will ensure constant radius $L_2$ of needle 15 after its cuts, for example, four-five cuts. With precise cutting, the needle is shortened approximately $0.5*10^{-3}$ m. It must be noted that, in order for controlled displacement of needle 15 to occur along central guide BH in the process of its fastening (for safeguarding a constant radius $L_2$ of needle 15 after its cuts), the above-mentioned second size of the marginal surface of end 70 must be more than the first size of the microroughnesses of V-shaped groove 66. In particular, the height along longitudinal axis KP of the microroughnesses of V-shaped groove 66 can be within the limits of $10^{-6}$ m to $5*10^{-6}$ m, and the height along longitudinal axis KP of the microroughnesses of the marginal surface of end 70 can be within the limits of $2*10^{-5}$ m to $10^{-4}$ m. In this case, the microroughness of the marginal surface of end 70 will grip needle 15 and move it along V-shaped groove 66 in the direction of central guide BH practically without resistance on the part of the microroughnesses of V-shaped groove 66.

When displacement of needle 15 is not required in the process of its fixation in bracket 67, the above-mentioned second size of the marginal surface of end 70 must be less than the first size of the microroughnesses of V-shaped groove 66. In particular, the height along longitudinal axis KP of the microroughnesses of V-shaped groove 66 can be within the limits of $2*10^{-5}$ m to $10^{-4}$ m, and the height along longitudinal axis KP of the microroughnesses of the marginal surface of end 70 can be within the limits of $10^{-6}$ m to $5*10^{-6}$ m.

Precise hold 65 of needle 15 can be made in the form of a separate unit and be fastened to first measuring head 13. For this, a mounting place can be made in first measuring head 13 for fastening in it, for example, by screws, precise hold 65 of needle 15 (not shown).

One of the mounting embodiments of cantilever 18 for atomic power measurements is represented in FIGS. 9-11. Cantilever 18 comprises chip 74, stand 72, whose one end is rigidly linked with chip 74, and another has point 73. Group microelectronics technology ensure optimal length, for atomic power measurements, of stand 72 (FIGS. 9-0) of cantilever 18 and coordinate fixing of point 73 relative to chip 74. They consist in the fact that chip 74, stand 72 and point 73 are prepared by the photolithography method. In this case, consistent coincidence of topological figures occurs with error not worse than $10^{-6}$ m. Correspondingly, an error in the arrangement of point 73 relative to chip 74 will have a value of $2*10^{-6}$ m to $5*10^{-6}$ m.

Mounting of cantilever 18 is accomplished in first precise hold 75 of cantilever 18 with utilization of first support 76, second support 77 with bevel 78 and spring element 79. First 76 and second 77 supports, and also elastic (for example, spring) element 79 are fastened to first plate 80 (for example, by screws, not shown). In first precise hold 75, mounting and removal of cantilever 18 is ensured due to the motion of cantilever 18 in the direction, indicated by arrow C in FIG. 11. Shifting of cantilever 18 to bevel 78 upon its mounting can be accomplished by hand.

First precise hold 75 can be a separate unit fastened to second measuring head 16. For this, an adjusting place can be made in second measuring head 16 for fastening first precise cantilever hold 75 in it by screws. This mounting permits point 73 to go out into the study zone of sample 6 with high precision (order of $5*10^{-6}$ m), for example, after changing broken cantilever 18 to new.

As shown in FIGS. 12-13, mounting of cantilever 18 can also be accomplished in second (alternative to first) precise hold 81 of cantilever 18. Second precise hold 81 comprises second plate 82, on which are fastened third support 83 and fourth support 84 with bevel 85, and also cam 86 with elastic (for example, Viton) element 87. Fastening of cantilever 18 takes place by cam 86 through elastic element 87. Upon its left-handed threading (i.e., upon rotation in the direction of counterclockwise arrow D on FIG. 12), chip 74 of cantilever 18 will simultaneously be pressed against bevel 85 and third support 83. This will ensure rapid, precise and reliable mounting of cantilever 18 in second precise hold 81.

In one of the embodiments, coupling is possible of the complicated analogs of first 13 and second 16 measuring heads, represented in FIG. 14 by complicated measuring head 93 (extended along privileged axis $E_1E_2$), with mechanized drives. In this case, on guide 88 in FIG. 14 (analog to guide 10 in FIG. 1) is fastened a mechanized drive, which comprises electric motor 89 with reduction gear 90. The mechanized drive also comprises a screw, nut and clamping fixture (not shown). The mechanized drive forbids angular turning of tappet 91. The latter only effects linear displacement along guide 88 of parallelly privileged axis $E_1E_2$ in FIG. 14. Tappet 91 can be linked with cut-out 92 of complicated measuring head 93, due to which the possibility is simultaneously ensured of linear displacement of complicated measuring head 93 and its tilting, for example, for replacement of needle 15. To increase reliability of operation on complicated measuring head 93, magnet 94 can be mounted, which ensures its clamping to guide 88. For reliable attraction of magnet 94, guide 88 can be made out ferromagnetic material. For mounting complicated measuring head 93 in first and second extreme positions (limiting the course of complicated measuring head 93 along privileged axis $E_1E_2$), guide 88 can be furnished with first and second extreme position sensors 95 and 96. As such first and second extreme position sensors 95 and 96, optical sensors, sensors based on sealed-contact reed relays, or contact electric sensors can be used. A signal about stopping in the first extreme position is given by first extreme position sensor 95 upon electrical interlocking of first contacts 97 and 98 by first flexible conductor 99, fastened to complicated measuring head 93. In the other (second) extreme position, stopping of complicated measuring head 93 is accomplished after the corresponding signal from second extreme position sensor 96, due to closing of second contacts 100 and 101 by second flexible conductor 102 (which is also fastened to complicated measuring head 93). The remaining structural elements of complicated measuring head 93, depicted in FIG. 14, are analogous to the corresponding structural elements (described above) on first 13 and second 16 measuring heads (see also FIG. 1). Electric motor 89 and first 95 and second 96 extreme position sensors are electrically connected with control unit 30.

The device works as follows. Sample 6 (FIG. 1) is fastened on object holder 5. First 13 and second 16 measuring heads are turned from the initial position to the stop of projections 39 in ends 40 (FIG. 2-3) by holds 14 and 17 upward (according to the arrow of the Z-axis in =FIG. 1, which is oriented, for example, opposite the force of gravity) and the required probes are mounted. First 13 and second 16 measuring heads are returned to the initial position. They move the required head (for example, first measuring head 13) to the stop in first screw 34. Using first 2 and second 7 two-coordinate tables and optical microscope 8, the measuring area is selected. Using preliminary approach unit 3, the approach of sample 6 to needle 15 is accomplished to a distance, of $10^{-3}$ m to the measuring area. Then the position in the space of the measuring area is corrected with the aid of first 2 and second 7 two-coordinate tables. After this, the final approach of sample 6 to needle 15 and scanning (in tunnel mode) by needle 15 of the sample 6 surface oriented toward it are carried out.

When operating in atomic power mode after second measuring head 16 (FIG. 1) is withdrawn in the working zone (to stop 12), a laser beam, radiated by laser 20, is directed (with the aid of automated shift of laser 20) at cantilever 18. Photoreceiver 25 is further directed (with the aid of automated shift of photoreceiver 25) at the corresponding laser beam, reflected from cantilever 18. After this, the final approach of sample 6 to cantilever 18 and scanning (in atomic power mode) by cantilever 18 of the sample 6 surface oriented toward it are accomplished.

To change work mode (for example, to change from atomic power mode to tunnel mode), sample 6 is removed from cantilever 18 using preliminary approach unit 3. Second measuring head 16 is displaced to the extreme position most removed from the measuring area (from sample 6) (to the extreme right position of second measuring head 16 in FIG. 1). First measuring head 13 is moved into the measuring area (to stop 12 in FIG. 1), after which the approach of needle 15 to sample 6 and scanning by needle 15 of the sample 6 surface oriented toward it (in tunnel mode) is similarly carried out.

When utilizing first (tunnel) measuring head 13 in tunnel mode, laser 20 and photoreceiver 25 are usually not used.

Fluid module 45 (FIG. 4) is mounted in catch 42 with first 13 and second 16 measuring heads separated to the different sides.

Reservoir 49 is fastened to object holder 5, sample 6 is mounted in reservoir 49, fluid is poured in and measurements are conducted by the probe in power mode, i.e., by cantilever 48 for fluid measurements, as was described above. With measurements in electrochemical mode, voltage can be sent to the conducting tightening leg from unit 30.

Hardness measurement module, 53 is mounted on platform 9 in catch 42 similar to fluid module 45 and the approach of sample 6 to needle 57 is accomplished. After this, utilizing quartz resonator 56, scanning and hardness measurements are conducted on sample 6. The amplitude of the oscillations of quartz resonator 56 (transmitted in the form of a signal to unit 30 and fixed by it) changes depending on a change in the hardness of the area measured (surface of sample oriented toward needle 57).

The operation of warming unit 59 consists in supplying from unit 30 current to helix 60 in accordance with the required temperature which is fixed by thermocouple 62. Besides this, the temperature of the sample can be measured by remote noncontact temperature gauge 63 (by optical pyrometer or by infrared thermometer), which is suitable also for calibrating thermocouple 62. The process of fastening, respectively, needle 15 in precise hold 65 (FIGS. 7-8) and cantilever 18 in first 75 or alternative to it second 81 precise holds (FIG. 9-13) is described above in detail and, in order to avoid repetition, is here omitted.

The specific operation of complicated (mechanized) measuring head 93 is connected with selection of the thickness of first 99 and second 102 flexible conductors and their adjustments. They can be made out of beryllium bronze.

To reduce the probability of electric arc (sparks) occurring upon electrical connection, first 99 flexible conductor touches first contacts 97, 98 alternately, i.e., nonsimultaneously. For example, initially first 99 flexible conductor touches one first contact labelled number 97 in FIG. 14 and only then, after a predetermined first relaxation time $T_1$, does it touch another first contact labelled number 98 in FIG. 14, finally closing first contacts 97, 98 to each other practically without creating sparks. For this, first contacts 97, 98 are spread from each other along privileged axis $E_1E_2$ to a predetermined distance, for example, from $0.1*10^{-3}$ m to $0.2*10^{-3}$ m. The same goal can be achieved via selective bending of the corresponding amplitude of first 99 flexible conductor in the plane comprising privileged axis $E_1E_2$.

By analogy, to reduce the probability of sparks occurring upon electrical connection, the second 102 flexible conductor touches second contacts 100, 101 alternately, i.e., nonsimultaneously. For example, initially second 102 flexible conductor touches one second contact labelled number 100 in FIG. 14 and only then, after a predetermined second relaxation time $T_2$, does it touch another second contact labelled number 101 in FIG. 14, finally closing second contacts 100, 101 to each other practically without creating sparks. For this, second contacts 100, 101 are spread from each other along privileged axis $E_1E_2$ to a predetermined distance, for example, $0.1*10^{-3}$ m to $0.2*10^{-3}$ m. The same goal can be achieved via corresponding selective bending of the corresponding amplitude of second 102 flexible conductor in the plane comprising privileged axis $E_1E_2$.

Besides this, a gold covering can be applied to first 99 and second 102 flexible conductors, and also to first 97, 98, and second 100, 101 contacts to increase the reliability of the device's operation.

Execution of optical unit 29 in the form of mobile, along first 21 and second 26 two-coordinate guides, respectively, laser 20 and photoreceiver and also supplying platform 9 by first 10 and second 11 guides with first 13 and second 16 measuring heads mounted on them, optically linked with laser 20 and photoreceiver 25, expands the functional possibilities of the device due to operational change of work modes.

Utilization of second two-coordinate table 7 with optical microscope 8 makes it possible to select the field of measurement. Together with this, due to stops 12 with mobile first screws 34, an operational change in the measuring area is possible. In this case, second two-coordinate table 7 allows the SPK operator more rapidly and more easily to find the new measuring area with the aid of optical microscope 8. This also expands the functional possibilities of the device.

Utilization of the rotation of first 13 and second 16 measuring heads on cylindrical stocks 31 (relative to first 10 and second 11 guides, respectively) ensures operational loading of probes, which makes it possible to rapidly change work modes.

Use of fluid module 45 and hardness measurement module 53 expands the functional possibilities of the device.

Utilization simultaneously of two first 13 (for example, tunnel) or two second 16 (for example, atomic power) measuring heads expands the functional possibilities of same-type measurements. For example, it is operationally possible to go from electric-conducting to electron-conducting cantilevers.

Operationally changeable warming unit 59, which makes it possible to use it in all work modes, gives additional information about objects (samples 6).

Simultaneous inclusion in warming unit 59 of thermocouple 62 and noncontact temperature gauge 63 makes it possible to perform operational calibration of the thermocouple, which simplifies the apparatus operation.

Utilization in precise hold 65 of needle 15 of screws 69 with right or left-handed thread, by specially machined end 70 (at the point of the surface of end 70 oriented toward the needle 15), and also with longitudinal axis KP offset relative to central guide BH of V-shaped groove 66, permits accomplishing mounting of needle 15 in operating position with predetermined precision.

Utilization in first precise hold 75 of cantilever 18 of first supports 76, second supports 77 with bevel 78 and spring element 79 permits accomplishing mounting of cantilever 18 in operating position with predetermined precision.

Utilization in second precise hold 81 of cantilever 18 of third supports 83, fourth supports 84 with bevel 85 and cam 86 with elastic element 87 permits accomplishing safe for flexible girder 72 mounting of cantilever 18 in operating position with predetermined precision.

Simple and precise mounting of needle 15 and cantilever 18 ensures operational change of SPM work modes.

The mechanized drives of first 13 and second 16 measuring heads additionally simplify the operation of the apparatus.

The invention claimed is:

1. Multifunctional scanning probe microscope, which comprises:
   a base,
   a preliminary approach unit, movably mounted on the base,
   a piezo-scanner, disposed on the preliminary approach unit,
   an object holder, disposed on the piezo-scanner,
   a sample, comprising a measuring area and fastened to the piezo-scanner with the aid of the object holder,
   a platform, fastened to the base opposite the sample,
   an analyzer, mounted on the platform and comprising a first measuring head, oriented toward the sample and adapted for probing the measuring area of the sample, and
   first and second guides, fastened to the platform,
       wherein the analyzer comprises a second measuring head, oriented toward the sample and adapted for probing the measuring area of the sample,
       and wherein first and second measuring heads are movably mounted, respectively, on the first and second guides.

2. Multifunctional scanning probe microscope according to claim 1, which comprises an optical unit, fastened to the base and including:
   a laser module,
   first two-coordinate guides, oriented toward the sample and fastened to the laser module,
   a laser, movably mounted on the first two-coordinate guides and that can be optically linked with the measuring area of the sample,
   a receiving module,
   second two-coordinate guides, oriented toward the sample and fastened to the receiving module,
   a photoreceiver, movably mounted on the second two-coordinate guides and that can be optically linked with the measuring area of the sample.

3. Multifunctional scanning probe microscope according to claim 1, which comprises:
   a first two-coordinate table, connecting the preliminary approach unit with the base,
   a second two-coordinate table, and
   an optical microscope, fastened to the second two-coordinate table.

4. Multifunctional scanning probe microscope according to claim 1, wherein the platform comprises stops with mobile screws, and wherein the first and second measuring heads are adapted to:
   linearly move along the first and second guides, respectively, to stops, and/or
   radially move relative to the first and second guides, respectively.

5. Multifunctional scanning probe microscope according to claim 1, which comprises:
   a fluid module,
   a fluid reservoir, and
   a catch,
       wherein the catch is mounted on the platform, the fluid module is orientedly mounted on the catch, and the fluid reservoir is fastened to the object holder and linked with the analyzer.

6. Multifunctional scanning probe microscope according to claim 1, which comprises a hardness measurement module, orientedly mounted on a catch.

7. Multifunctional scanning probe microscope according to claim 1, wherein the first and second measuring heads, simultaneously mounted on the first and second guides, respectively, are heads of at least one of the types mentioned below: (a) tunnel head, in which the probe is made in the form of a needle, and the probe holder is made in the form of a hold of the needle; (b) atomic power head, in which the probe is made in the form of a cantilever, and the probe holder in the form of a hold of the cantilever.

8. Multifunctional scanning probe microscope according to claim 1, which comprises:
   a warming unit,
   a thermocouple, and
   a noncontact temperature gauge,
       wherein the warming unit is mounted on the object holder, the thermocouple is fastened to the warming unit, and the noncontact temperature gauge is optically linked with the sample.

9. Multifunctional scanning probe microscope according to claim 1, in which is introduced a precise hold of a needle comprising:
   a bracket with a V-shaped groove, extended along a central guide of the V-shaped groove and having microroughness of a predetermined first size,
   a screw, extended along a longitudinal axis of the screw, mounted in the bracket and linked with the V-shaped groove.

10. Multifunctional scanning probe microscope according to claim 9, wherein the screw has a right-handed thread and the longitudinal axis of the screw is offset relative to the central guide of the V-shaped groove.

11. Multifunctional scanning probe microscope according to claim 9, wherein the screw has a left-handed thread and the longitudinal axis of the screw is offset relative to the central guide of the V-shaped groove.

12. Multifunctional scanning probe microscope according to claim 9, wherein the screw comprises an end, whose marginal surface has a microroughness of a predetermined second size greater in comparison with a first size of a microroughnesses of the V-shaped groove.

13. Multifunctional scanning probe microscope according to claim 1, in which is introduced a first precise hold of a cantilever, that comprises:
   a first support,
   a second support with a bevel,
   a first plate, and
   a spring element,
wherein
   the first support, the second support with the bevel and the spring element are fastened to the first plate and are adapted to interact with the cantilever, and
   the spring element is mounted opposite the first support.

14. Multifunctional scanning probe microscope according to claim 1, in which is introduced a second precise hold of a cantilever comprising:
   a third support,
   a fourth support with a bevel,
   a second plate,
   a cam with an elastic element, and
   wherein
   the third support, the fourth support with the bevel and the cam with the elastic element are fastened to the second plate and are adapted to interact with the cantilever, and
   the cam is mounted on the second plate opposite the fourth support with the bevel.

15. Multifunctional scanning probe microscope according to claim 1, wherein the first and second measuring heads comprise mechanized drives.

16. Multifunctional scanning probe microscope according to claim 4, which comprises a hardness measurement module, orientedly mounted on the catch.

17. Multifunctional scanning probe microscope according to claim 4, which comprises:
   a warming unit,
   a thermocouple, and
   a noncontact temperature gauge,
   wherein the warming unit is mounted on the object holder, the thermocouple is fastened to the warming unit, and the noncontact temperature gauge is optically linked with the sample.

18. Multifunctional scanning probe microscope according to claim 11, wherein the screw comprises an end, whose marginal surface has a microroughness of a predetermined second size greater in comparison with a first size of a microroughnesses of the V-shaped groove.

19. Multifunctional scanning probe microscope according to claim 9, in which is introduced a first precise hold of a cantilever, that comprises:
   a first support,
   a second support with a bevel,
   a first plate, and
   a spring element,
wherein
   the first support, the second support with the bevel and the spring element are fastened to the first plate and are adapted to interact with the cantilever, and
   the spring element is mounted opposite the first support.

20. Multifunctional scanning probe microscope according to claim 9, in which is introduced a second precise hold of a cantilever comprising:
   a third support,
   a fourth support with a bevel,
   a second plate,
   a cam with an elastic element, and
   wherein
   the third support, the fourth support with the bevel and the cam with the elastic element are fastened to the second plate and are adapted to interact with the cantilever, and
   the cam is mounted on the second plate opposite the fourth support with the bevel.

* * * * *